United States Patent [19]
Reynolds

[11] 3,870,259
[45] Mar. 11, 1975

[54] FISHING ROD HOLDER
[76] Inventor: Lester A. Reynolds, 95-184 Mohai Pl., Mililani Town, Hawaii 96889
[22] Filed: Aug. 8, 1973
[21] Appl. No.: 386,646

[52] U.S. Cl.................................... 248/43, 43/21.2
[51] Int. Cl............................................ A01k 97/10
[58] Field of Search ............... 43/15, 21.2, 25, 25.2; 24/155 SD, 3 E, 11 CT; 248/38, 42, 43, 224, 38

[56] References Cited
UNITED STATES PATENTS

| 519,427 | 5/1894 | Groff | 248/224 X |
| 595,218 | 12/1897 | Stauffer | 248/43 |
| 2,838,263 | 6/1958 | Drewrys | 248/43 |
| 2,851,812 | 9/1958 | Beck | 43/15 |
| 3,156,998 | 11/1964 | McDaniel | 43/25 X |
| 3,564,753 | 2/1971 | Fravel | 43/21.2 |

FOREIGN PATENTS OR APPLICATIONS

| 753,778 | 8/1956 | Great Britain | 248/224 |

OTHER PUBLICATIONS
Pruett Sand Spike Advertisement, received Nov. 21, 1931.
Pruett Novelty Works, 451 E. 47th St., Los Angeles, California.

*Primary Examiner*—Donald A. Griffin
*Attorney, Agent, or Firm*—James C. Wray

[57] ABSTRACT

A fishing rod holder has a tubular structure surrounding and supporting the fishing rod handle. The upper edge of the tubular structure is sloped so that the tubular structure reinforces the metal portion of the fishing rod opposite the point of reel attachment. An elastic annular bushing is attached to the interior wall of the holder tube to prevent fishing rod vibration. The holder tube is removably attached to the boat in a generally vertical orientation by a cleat and bracket. U-bolts surround the holder tube and fasten it to a cleat. The vertical position of the holder tube within the U-bolts and cleat is adjustable when the U-bolts are loosened. The cleat is capable of being inserted or removed from a bracket permanently mounted on a boat.

6 Claims, 4 Drawing Figures

PATENTED MAR 11 1975    3,870,259
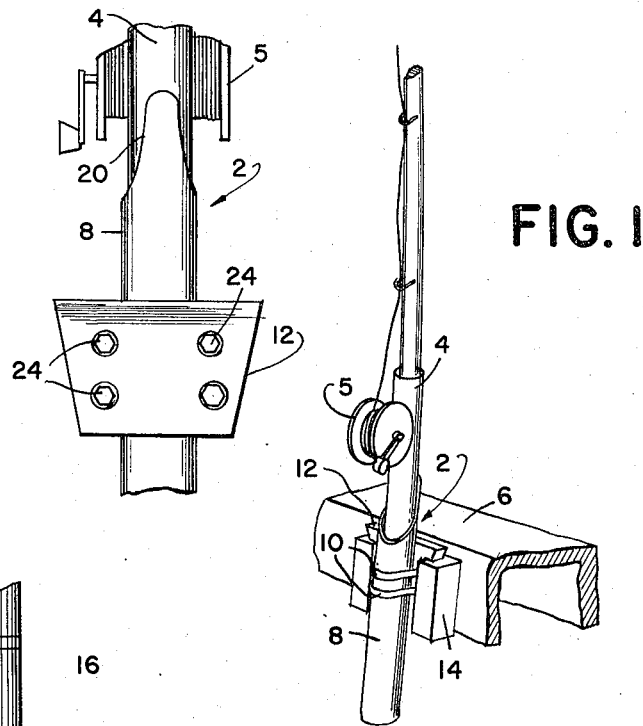
FIG. 1
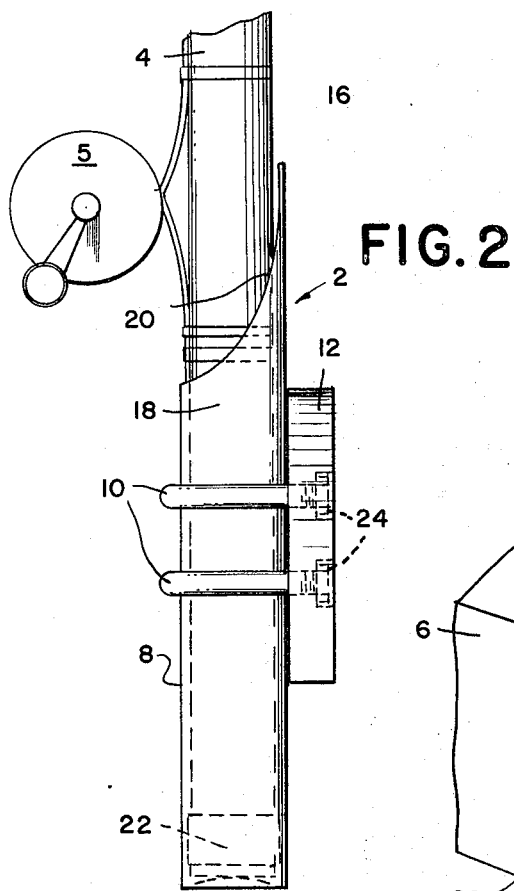
FIG. 3
FIG. 2
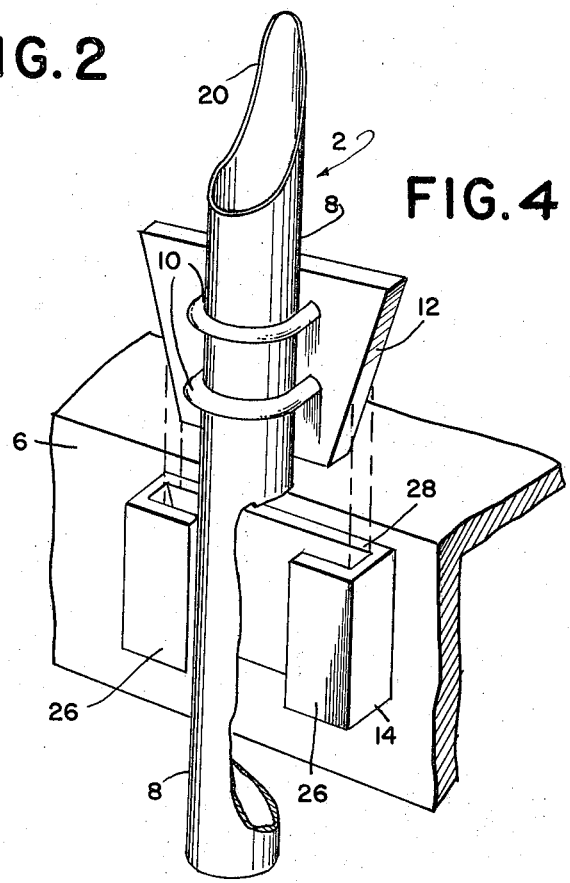
FIG. 4

FISHING ROD HOLDER

BACKGROUND OF THE INVENTION

The invention described herein concerns improvements in a boat-mounted fishing rod holder. Conventional fishing rod holders employ short holding channels or tubes which support the rods in nearly horizontal positions. Some rod holders are equipped with pins or jaws for engaging the poles within the rod holders. Other rod holders are removable from fixed brackets. It is the object of this invention to provide a superior, removable rod holder capable of engaging, supporting, and reinforcing the rod handle and reel assembly against breaking while the rod is in a vertical orientation.

Prior fishing rod holders have been employed to support rod handles. In a known device, the rod holder is designed in the form of a simple hollow cylinder. The rod is held in nearly vertical position by a spring tab which presses the rod handle against the inner wall of the cylinder. In another known apparatus, the rod is supported horizontally. The rod is held in position by an upward extending stop which contacts the reel and prevents the horizontal withdrawal of the rod.

Known, existing rod holders have employed rod engaging means consisting of crosspins and complementary formations in the rods. A known device employs spring jaws to fix the rod in a nearly horizontal position. One holder has a fixed bracket with set screws for receiving a leg of a rod holder.

A collection of devices of the type known in the prior art is found in the Official United States Patent Office Classification of Patents, particularly in Class 43, subclass 15 and Class 248, subclass 351. Examples of such devices are found in U.S. Pat. Nos. 3,564,753; 3,159,366; 2,851,812; and 2,249,302.

One problem of long standing exists in fishing for large game fish from a boat. A pole is positioned in a holder, and a drag is set on a reel which is sufficient to hold the hook and lure at a desired distance while the boat drags the line through the water. When a fish strikes, the suddenness and violence of the strike often pulls on the line with such force as to break the rod. Conventional holders engage only the wooden part of the rod handle, which snaps, dropping the rod and reel into the water.

A need exists for a fishing rod holder capable of engaging, supporting and reinforcing the fishing rod when the rod is in a vertical orientation. A need exists to provide vertical fishing rod holders which are removable from boat-mounted brackets and which are vertically adjustable with respect to their mounting brackets.

SUMMARY OF THE INVENTION

The present invention is a device for holding fishing rods in vertical positions by means of holder tubes which are fastened to boats. The tubular holders support and reinforce the entire wooden handles and metal upper portions of the rods. The upper edge of each tubular holder is sloped at an angle to provide mechanical support for the metal portion of the rod by partially encircling the rod opposite the region on which a fishing reel is normally attached.

In a preferred embodiment, an elastic means is attached to the interior wall of the holder tube for wedging the rod within the holder tube. A preferred embodiment of the wedging means is a short resilient segment. Another configuration of this elastic wedging means is an annular, rubber or plastic bushing. The wedging means eliminates fishing rod vibration.

In a preferred embodiment, the means for attaching the holder tube to the boat consists of a bracket, permanently mounted to a boat, and a cleat element capable of being inserted and removed from the bracket element. The cleat element is attached to the holder tube by means of U-bolts encircling the holder tube. In one configuration, the U-bolts are attached to the cleat element by means of nuts so that the vertical position of the holder tube can be adjusted with respect to the U-bolts and cleat element.

One object of the present invention is to provide a device for supporting a fishing rod in a vertical position for trolling from a boat. The rod holder reinforces the rod by supporting not only the entire length of the wooden rod handle but also the metal portion of the rod to which the reel is attached. This increases the rod's resistance to breakage if tension is suddenly placed on the fishing line.

Another object of the present invention is to provide a fishing rod holder with an elastic means for engaging the rod to eliminate rod chatter, i.e., the horizontal vibration of the rod handle held within a vertical tube.

Another object of the present invention is to provide a rod holder capable of being inserted into or removed from a permanently mounted bracket. Such a design permits the rod holder to be easily removed from the boat when the holder is not in use.

Another object of the present invention is to provide a holder tube whose vertical height is adjustable with respect to its mounting and the boat.

These and other objects and features of the invention are apparent in the disclosure, which includes the drawings and the specification with the foregoing and ongoing description and with the claims.

BRIEF DESCRIPTION OF THE DRAWINGS

FIG. 1 is a perspective view of the fishing rod holder with a fishing rod inserted therein.

FIG. 2 is a cross-sectional side elevation of the fishing rod holder with a fishing rod inserted therein.

FIG. 3 is a rear elevation of the fishing rod holder showing the mounting cleat.

FIG. 4 is a perspective view of the fishing rod holder showing the method of inserting the cleat into the mounting bracket.

DETAILED DESCRIPTION OF THE DRAWINGS

Referring to FIG. 1, a fishing rod holder is generally denoted by the numeral 2. The fishing rod 4, to which the reel 5 is attached, is inserted in the rod holder tube 8. In a preferred embodiment, the rod holder tube is held to a cleat 12 by means of two U-bolts 10. The cleat is inserted in bracket 14, which is fixed to a member of the boat 6.

FIG. 2 is a cross-sectional side elevation of the fishing rod holder showing the position of the rod handle within the holder tube. The sloped upper edge of the holder tube 20 supports the portion of the rod to which the reel 5 is attached. In a preferred embodiment, an annular rubber or plastic bushing 22 is placed in the lower end of the holder tube 8. The rod 4 is inserted through the opening in the bushing. In a configuration permitting the U-bolts to be loosened or tightened to permit the height of the holder tube to be adjusted, the cleat 12 is fastened to U-bolts 10 by means of nuts 24.

FIG. 3 shows a rear elevation of the fishing rod holder removed from its mounting bracket. Cleat 12 of the preferred embodiment is attached to holder tube 8 by means of two U-bolts and four nuts 24.

FIG. 4 is a perspective view of the bracket and cleat mechanism of a preferred embodiment of the present invention. Trapezoidal cleat 12, narrowed at its bottom, is capable of being inserted into and removed from bracket 14. The protruding walls of the bracket 26 partially surround the cleat when the cleat is inserted into the bracket. The attachment face of bracket 28 is permanently fixed to boat member 6.

The new holder prevents rod breakage upon the shock of a strike. The holder is adjustable in height to conform to personal preferences and variations in boat designs. The holder is removable from fixed brackets on boat transoms to prevent and avoid injuries by protruding unused holders.

While the invention has been described with reference to specific embodiments, it will be obvious to those skilled in the art that modifications and variations may be constructed without departing from the spirit and scope of the invention. The scope of the invention is described in the following claims.

I claim:

1. A fishing rod holder comprising:
   a tubular holder structure surrounding and supporting the entire wooden handle and a part of the metal upper portion of a fishing rod, wherein the upper edge of the tubular holder structure is uniformly steeply sloped at an angle to provide mechanical support for the metal portion of the rod by partially embracing the metal portion of the rod opposite the region on which a fishing reel is normally attached, and
   a means attached to a side the tubular holder structure for affixing the tubular holder structure to a boat from which fishing is conducted, so that the tubular holder structure and fishing rod are maintained in a generally vertical orientation.

2. The fishing rod holder of claim 1 wherein the tubular holder structure further comprises an elastic means attached to an interior wall of the tubular holder structure at a remote bottom end for wedging the fishing rod within the tubular holder structure to prevent fishing rod vibration within the tubular holder structure.

3. The fishing rod holder of claim 2 wherein the means for wedging the fishing rod within the tubular holder structure comprises an annular rubber or plastic bushing at the tube bottom end.

4. The fishing rod holder of claim 1 wherein the means for attaching the tubular holder structure to a boat comprises a bracket permanently mounted to a boat and a cleat element capable of being inserted in and removed from the bracket, and wherein the cleat element is attached laterally to the tubular holder structure.

5. The fishing rod holder comprising:
   a tubular holder structure surrounding and supporting the entire wooden handle and a part of the metal upper portion of a fishing rod, wherein the upper edge of the tubular holder structure is sloped at an angle to provide mechanical support for the metal portion of the rod by partially embracing the metal portion of the rod opposite the region on which a fishing reel is normally attached, and
   a means attached to the tubular holder structure for affixing the tubular holder structure to a boat from which fishing is conducted, so that the tubular holder structure and fishing rod are maintained in a generally vertical orientation, wherein the means for attaching the tubular holder structure to a boat comprises a bracket permanently mounted to a boat and a cleat element capable of being inserted in and removed from the bracket, and wherein the cleat element is attached to the tubular holder structure by means of U-bolts encircling the tubular holder structure with the ends of the U-bolts affixed to the cleat element.

6. The fishing rod holder of claim 5 wherein the U-bolts encircling the tubular holder structure may be loosened and tightened so that the vertical position of the tubular structure with respect to the U-bolts and cleat element may be adjusted.

* * * * *